United States Patent [19]

Abe et al.

[11] Patent Number: 5,086,434
[45] Date of Patent: Feb. 4, 1992

[54] DATA COMMUNICATION PROCESS AND APPARATUS FOR DATA TRANSMISSION IN BLOCKS WHICH MAY INCLUDE MIXED DATA TYPES

[75] Inventors: Shintaro Abe, Fujisawa; Muneo Adachi, Yokohama; Naoyuki Okada, Yokohama; Yasuhito Shimamura, Yokohama, all of Japan

[73] Assignee: Canon Kabushiki Kaisha, Tokyo, Japan

[21] Appl. No.: 911,779

[22] Filed: Sep. 26, 1986

[30] Foreign Application Priority Data

| Sep. 30, 1985 [JP] | Japan | 60-217233 |
| Sep. 30, 1985 [JP] | Japan | 60-217234 |
| May 19, 1986 [JP] | Japan | 61-114017 |
| Sep. 11, 1986 [JP] | Japan | 61-215315 |

[51] Int. Cl.$^5$ .................. H04B 1/38; H04L 5/16
[52] U.S. Cl. .................. 375/7; 358/450; 358/453
[58] Field of Search .............. 375/7, 113, 114; 370/94, 100, 104, 99; 358/142, 148, 256, 257, 258, 263, 260, 280, 401, 425, 426, 261.3, 450, 448, 453

[56] References Cited

U.S. PATENT DOCUMENTS

| 3,500,336 | 3/1970 | Cuccio | 358/148 |
| 3,898,376 | 8/1975 | Nabeyama et al. | 358/148 |
| 3,961,137 | 6/1976 | Hutt et al. | 375/114 |
| 4,001,693 | 1/1977 | Stackhouse et al. | 375/114 |
| 4,029,900 | 6/1977 | Addeo | 375/114 |
| 4,366,505 | 12/1982 | Tsuda et al. | 358/260 |
| 4,419,699 | 12/1983 | Christopher et al. | 375/114 |
| 4,485,409 | 11/1984 | Schumacher | 358/294 |
| 4,496,989 | 1/1985 | Hirosawa | 358/296 |
| 4,501,000 | 2/1985 | Immink et al. | 375/25 |
| 4,519,068 | 5/1985 | Krebs et al. | 370/94 |
| 4,542,378 | 9/1985 | Suganuma et al. | 340/734 |
| 4,553,172 | 11/1985 | Yamada et al. | 358/280 |
| 4,555,775 | 11/1985 | Pike | 340/734 |
| 4,566,127 | 1/1986 | Sekiya et al. | 358/263 |
| 4,568,983 | 2/1986 | Bobick | 358/260 |
| 4,583,237 | 4/1986 | Haskell | 375/27 |
| 4,668,995 | 5/1987 | Chen et al. | 358/426 |
| 4,672,459 | 6/1987 | Kudo | 358/280 |

FOREIGN PATENT DOCUMENTS

| 1179778 | 12/1984 | Canada | 358/462 |
| 0029327A1 | 5/1981 | European Pat. Off. | |
| 0081767A1 | 6/1983 | European Pat. Off. | |
| 2156189 | 3/1984 | United Kingdom | 375/114 |

Primary Examiner—Stephen Chin
Attorney, Agent, or Firm—Fitzpatrick, Cella, Harper & Scinto

[57] ABSTRACT

A process for transmitting mixed data, composed of character code data and bit image data in blocks and an apparatus therefor. Efficient transmission can be achieved by selecting the size of blocks suitably according to the quantity of data in each block or the number of blocks.

13 Claims, 10 Drawing Sheets (a)

(b)

(c)

(b)

(b)

(b)

(b)

(a)

(b)

(c)

"$^S_P$" REPRESENTS BLANK CODE

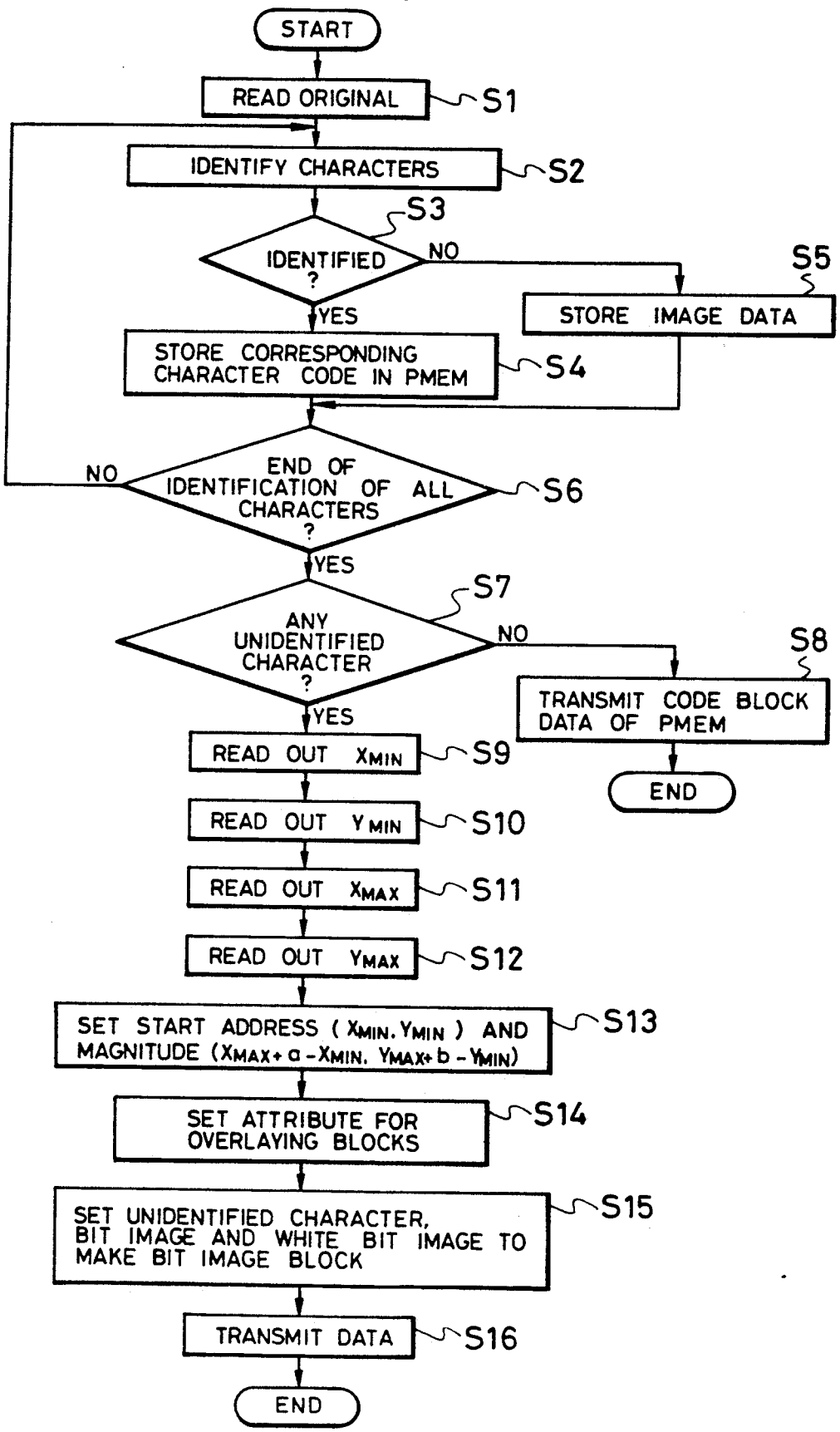

DATA COMMUNICATION PROCESS AND APPARATUS FOR DATA TRANSMISSION IN BLOCKS WHICH MAY INCLUDE MIXED DATA TYPES

BACKGROUND OF THE INVENTION

1. Field of the Invention

The present invention relates to a process for data transmission and an apparatus therefor, and in particular to a process and apparatus for transmitting mixed data.

2. Related Background Art

For transmitting mixed data of different kinds, such as character code data and bit image data, there has already been proposed a process of dividing a text into a plurality of character code blocks and bit image block, and transmitting the blocks in succession.

However, in a case where many characters, photographs and pictures are mixedly present, there will be involved a large number of blocks, which require a complicated protocol in transmission and a long time for reconstruction of the text upon reception, thus leading to a reduced efficiency of transmission.

SUMMARY OF THE INVENTION

In consideration of the foregoing, an object of the present invention is to provide a process for transmitting mixed data.

Another object of the present invention is to provide a process for transmitting mixed data with a high transmission efficiency.

Still another object of the present invention is to provide an efficient process for transmitting a document containing areas where characters and non-character images are overlapped.

Still another object of the present invention is to provide a process of transmission allowing easy reproduction of the original document from mixed data.

Still another object of the present invention is to provide a data transmission process for transmitting a document by suitably dividing the same into blocks.

Still another object of the present invention is to provide a data transmission process for transmitting a document by dividing the same into a limited number of blocks.

Still another object of the present invention is to provide a data transmission system capable of transmitting, in mixed manner, data obtained by word processing and data obtained by image processing.

Still another object of the present invention is to provide a communication terminal apparatus enabling efficient processing of mixed data.

Still another object of the present invention is to provide a data transmission process capable of transmitting data obtained by character recognition.

According to the present invention, these objects are achieved by directing mixed data into blocks on the basis of data type and a state of the date mixture, and transmitting each block. According to the invention, the data is preferably divided into blocks in such a way as to reduce the number of blocks. The amount of data per block may vary. Several modes of data division may be available, a given mode being selected so as to reduce the number of blocks. For example, respective blocks may be formed of character code data, of image data, and of image data overlapping at least partially with character code data. Again, a conversion process (such as data coding) may be employed, and respective blocks may be provided for converted data, and for data that cannot be converted.

The foregoing and still other objects, features and advantages of the present invention will become fully apparent from the following detailed description of the preferred embodiments, taken in conjunction with the accompanying drawings.

BRIEF DESCRIPTION OF THE DRAWINGS

FIGS. 5, 8A, 8B and 10 are flow charts showing a transmitting process.

DETAILED DESCRIPTION OF THE PREFERRED EMBODIMENTS

Figure 1:
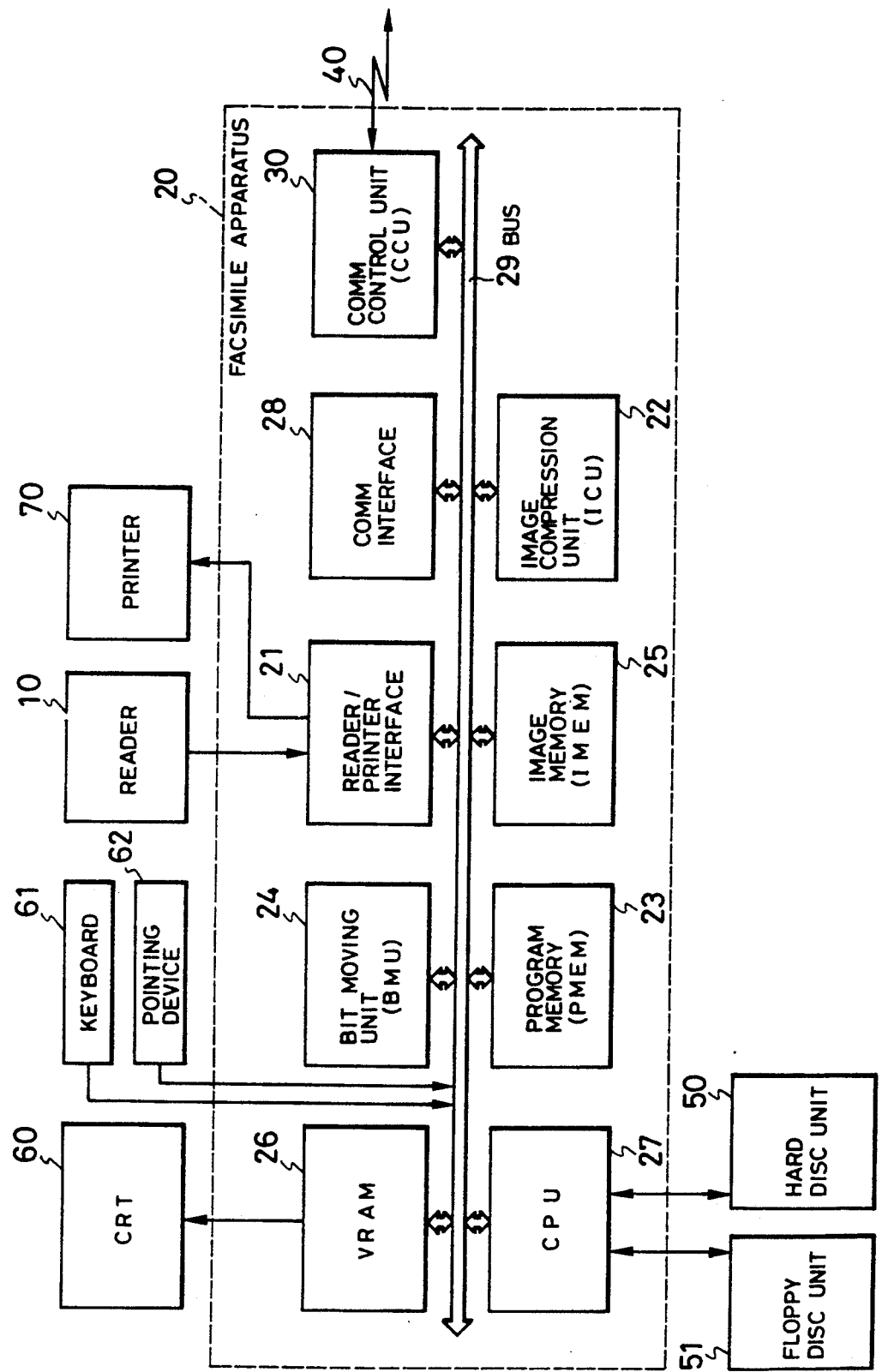
FIG. 1 is a block diagram of a communication terminal apparatus employing a transmission process of the present invention.
Figure 2:
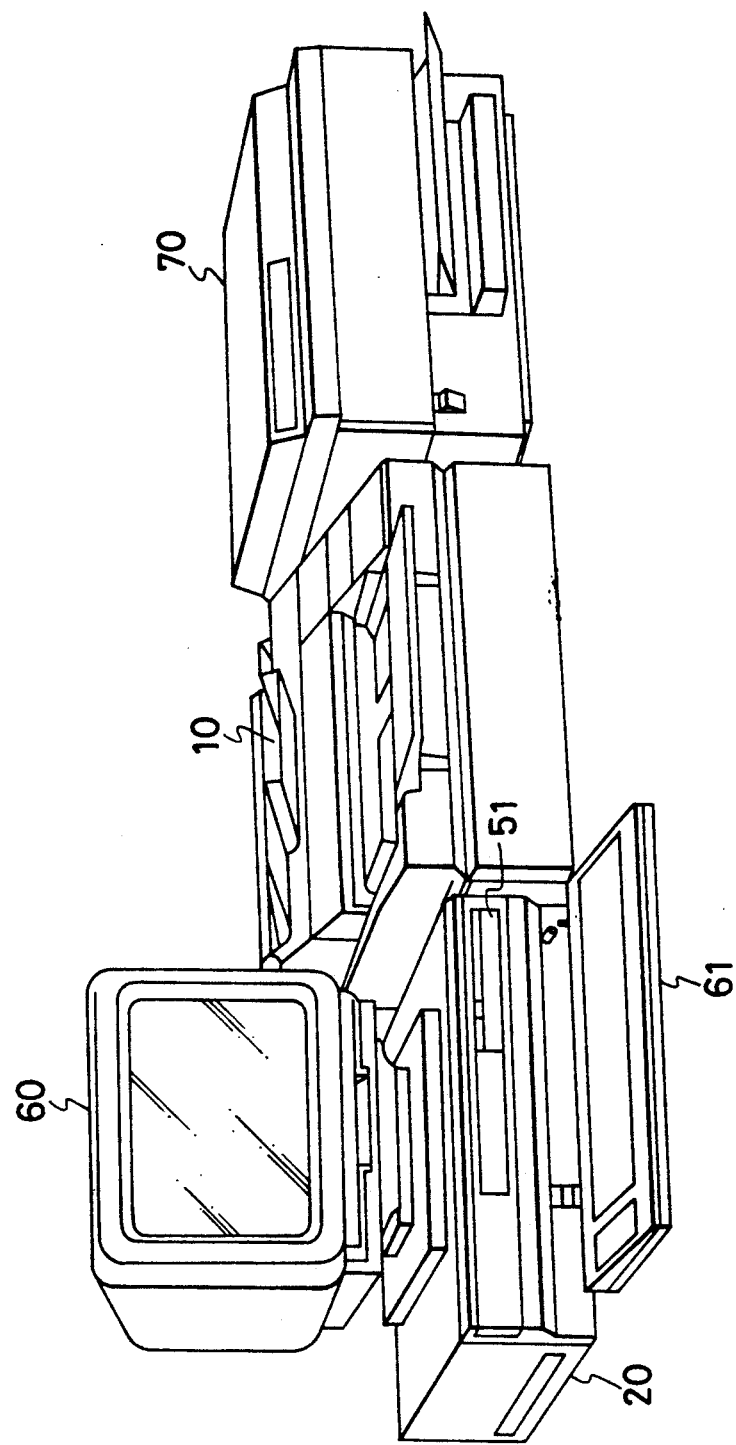
FIG. 2 is a perspective view of a communication apparatus embodying the present invention.

FIG. 1 is a block diagram of an embodiment of the present invention, and FIG. 2 is a perspective view of that embodiment.

A reader 10 is provided to generate an electrical signal by reading an original document.

A facsimile apparatus 20 is provided with a reader/printer interface 21; an image compression unit (ICU) 22; a program memory (PMEM) 23; a bit move unit (BMU) 24; an image memory (IMEM) 25; a video random access memory (VRAM) 26; a central processing unit (CPU) 27; a communication interface 28; a bus 29; and a communication control unit (CCU) 30.

The image compression unit (ICU) 22 is provided for compressing or expanding data, and employs a two-dimensional compression (high compression) for increasing the encoding rate.

The program memory (PMEM) 23 is provided with memory areas for an operation system program and an application program for controlling input/output devices and various units of the facsimile apparatus 20, for a font memory for converting character code data into image bit data, and for storing and editing text code data or character data obtained by key entry or word processing.

The program memory (PMEM) 23 is provided with a memory management unit (MMEU) and a work area functioning as a buffer for transmitting data from a rigid disk 50 through the communication control unit (CCU) 30 or receiving data from the unit 30 to be sent to the rigid disk 50 and for transmission speed matching between the rigid disk and the communication channel.

The bit move unit (BMU) 24 is provided for image processing such as enlargement, reduction, rotation, displacement or extraction of a predetermined image in bit unit on a cathode ray tube 60.

The image memory (IMEM) 25 has a capacity of 4 Mbytes for storing image data from the reader, edited image data obtained from the bit move unit 24, or bit data (for example of 1 bit per pixel) converted into an image from text code data, mixed data or character code data obtained by key entry or word processing. The mixed data include both bit image data and character code data in a page. These data are divided into image blocks and character blocks, each of which is given an identification code for administration and storage. The image memory 25 is also utilized as a buffer for temporarily storing predetermined data, thereby matching the speed of the reader 10, printer 70 and communication channel 40.

The video random access memory (VRAM) 26 is provided for storing image data to be displayed on the cathode ray tube 60 by a bit map data for example of a bit per pixel.

As non-volatile external memories there are provided a rigid (hard) disk memory 50 and a floppy disk memory 51, which may be replaced by another non-volatile backup memory, for storing data to be transmitted or data received.

A keyboard 61 is provided for entering command data for transmission or reception, command data for word processing, or image processing, and character data for word processing.

A pointing device 62 is used for moving a cursor image on the cathode ray tube 60, thus designating a position for image processing etc. Also, the device 62 is used for block designation of mixed data. Coordinates indicating the blocks are stored and administered by the program memory (PMEM) and treated as a part of identification code data or a header at data transmission.

For high speed transmission of a large amount of image data with a high resolving power (density), the communication channel 40 is preferably composed of a digital channel, for example a digital data network or a digital data packet network, of for example 64 Kbit/sec.

The printer 70 is composed of a laser beam printer capable of data printing at a rate of 3 Mbps.

FIG. 3(a) through (c) show a page of mixed data divided into blocks 1–8, corresponding to the display frame of a page on the cathode ray tube 60, to the data of one page at data transmission, or to the print sheet of a page at the printing of received data. In case of preparing such mixed data of plural pages, storing the same in the rigid disk 50 and transmitting the data at a time, header data 1 - n are attached in front of block data 1 - n as shown in FIG. 4, and each header indicates whether the succeeding block data are image data or character data, the size of the block data, and the position thereof in a page. Signal A is an acknowledge signal for transmission or reception of block data, and a signal EOP is emitted when the transmission of a page is completed.

Data of a page of the original from the reader 10 are stored in the image memory 25, then transferred to the VRAM 26 and displayed on the cathode ray tube 60. The image thus displayed is trimmed by means of the bit move unit 24 according to editing instructions given via the keyboard 61 or the pointing device 62, to obtain an image corresponding to a block 3, which is again stored in the memory 25.

Text code data from the keyboard 61 are stored in the memory 23, then converted into bit data, transferred to the VRAM 26 and displayed, as a text of one page, on the cathode ray tube 60. The data are edited in the same manner as the image processing to obtain character data corresponding to blocks 1–6 shown in FIG. 3, and again stored in the memory 23, in the form of codes. Position data of each block are controlled, together with information regarding certain attributes of the data, in the memory 23. Then, in response to a following command, image data and position data of the blocks 7, 8 of the memory 25 are read and displayed, through the VRAM, in the position of the block 3 on the cathode ray tube 60, thus finally providing a display of blocks 1–8 shown in FIG. 3. These mixed data are read from the memories 23, 25 in the order of blocks 1–8 and are stored in the rigid disk 50.

FIG. 3(c) shows an example of the document of a page after editing, wherein blocks 1 to 6 are character code blocks, and blocks 7, 8 are bit image blocks.

Thus there is required a large number of blocks in transmission if character code blocks and bit image blocks are mixed in the document.

These blocks can however be converted into two blocks 9, 10 as shown in FIGS. 3(a) and 3(b).

FIG. 3(a) shows the code block 9, in which an area corresponding to the block 7 need not be filled with codes since it is positioned at the end of lines, but, in an area corresponding to the block 8, spaces between character codes are filled in with blank codes such as space or tabulator codes.

FIG. 3(b) shows the bit image block 10 which is selected as the smallest rectangular block at least including the blocks 7 and 8, but there may be employed any rectangular block without limitation in size. An area corresponding to the character code block shown in FIG. 3(c) is totally filled with white bits.

Figure 5:
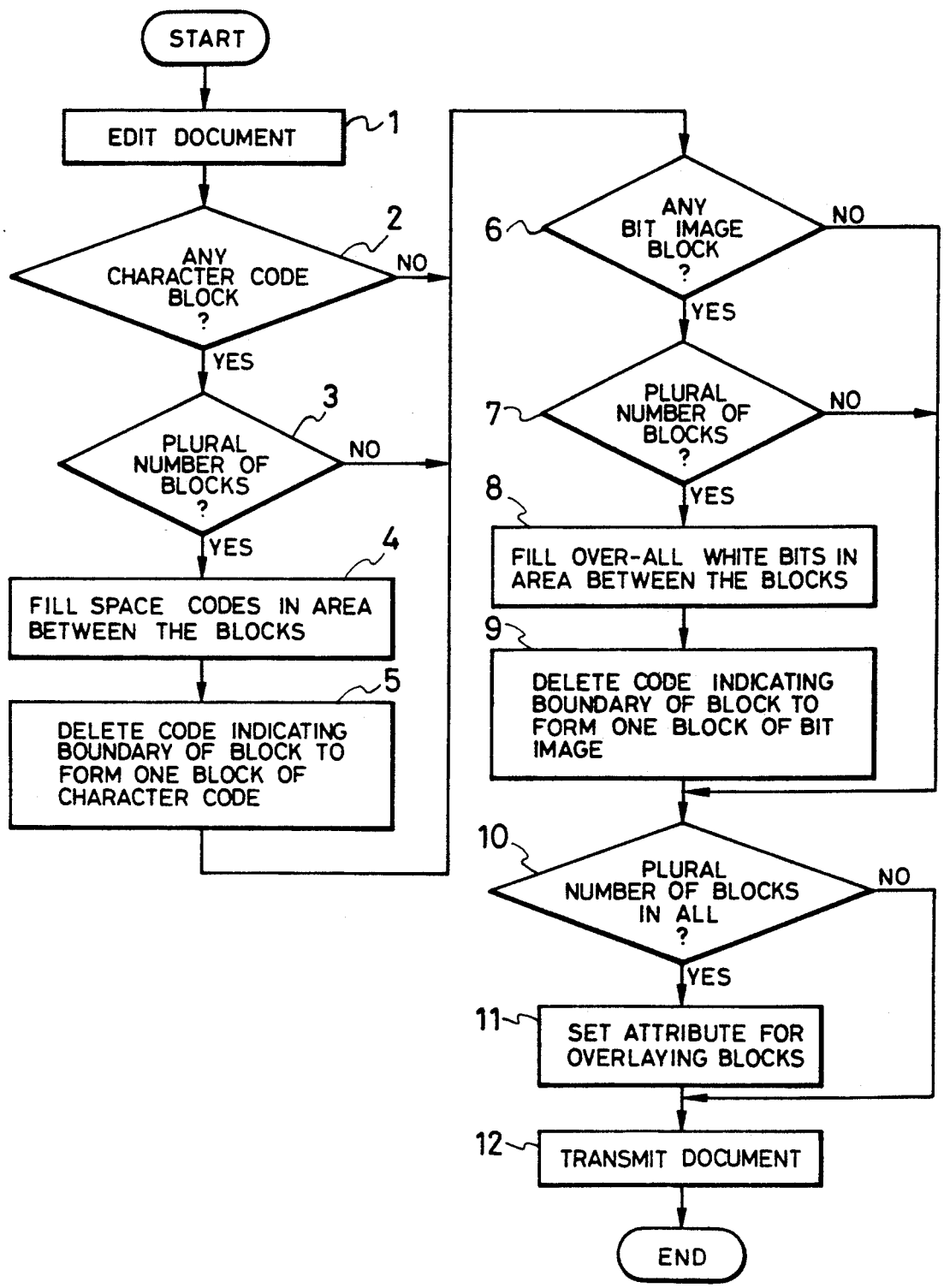

FIG. 5 is a flow chart for block conversion. At first a document as shown in FIG. 3(c) is obtained by combining the bit image data from the reader 10 and the code data from the keyboard 61 on the cathode ray tube 60 through a process as explained before, and there are entered a code indicating the boundary of a block (for example, indicating a starting coordinate of the block and the dimensions thereof) and an attribute code indicating the nature of the block. Then there is discriminated, from the attribute code, whether a character code block is present (2), then, if such is present, there is discriminated whether plural blocks are present (3), and, if plural blocks are present, the block area 8 between such plural blocks is filled with space codes (4). The block 7 need not be filled with the space codes because return codes are present at the boundary with the block 2. Then a block consisting solely of character codes is obtained by deleting such codes indicating the block boundary and changing the attribute of the block, and is stored in the PMEM (5).

Subsequently there is discriminated where a bit image block is present (6), then, if one is present, there is discriminated whether plural blocks are present (7), and, if plural blocks are present, the space between the blocks is filled with white bits (8). Subsequently the attribute of the block is changed by deleting the codes indicating the boundary of the blocks, and a block consisting solely of bit image is stored in the IMEM (9). Then there is discriminated whether plural blocks are present in total (10). As there are the character code block 9 and image block 10 in this case, an overlapping attribute code is set in the PMEM, instructing to overlay of these blocks, taking a point A of the block 9 as the reference. Then, in response to the entry of a transmission instruction, there are emitted, in succession, said overlapping attribute code, code data and bit image data respectively stored in the PMEM and IMEM. The attribute code may be transmitted after the transmission of the document data.

At the receiving side, the transmitted data of blocks 9, 10 are stored in the disk 50, and transferred to the PMEM and IMEM. The overlapping attribute code is transmitted before or after the data reception, then the data of the block 9 are converted into bit image data by a character generator, while the encoded data of the block 10 are decoded into bit image data by a decoder, and the data of these blocks are superposed with the point A as the reference to reproduce the transmitted next shown in FIG. 3(c), on the cathode ray tube 60 or on the printer 70.

Figure 6:
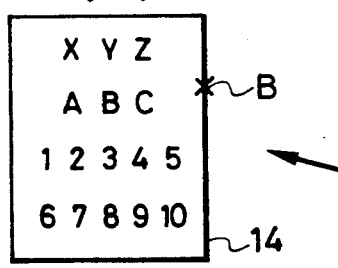
Figure 6:
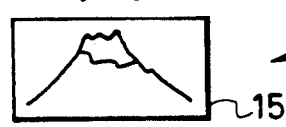
Figure 6:
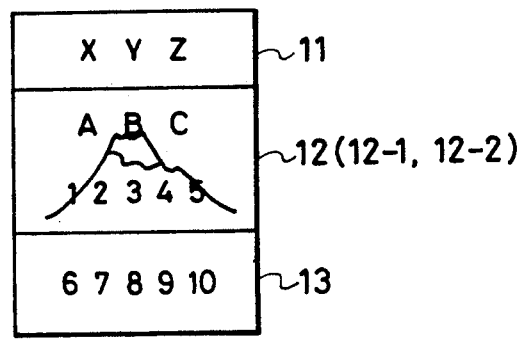

FIG. 6(c) shows a document which contains, between character code blocks 11 and 13, a block 12 in which character codes and bit image data are overlapped. The block 12 can be divided, for transmission, into a code block 12-1 and a bit image block 12-2 of the same size. In this case there will be required four blocks, but a higher efficiency of transmission can be attained in comparison with a case of further dividing the block 12 into overlapped blocks and non-overlapped blocks. In this case an overlapping attribute code is attached to the block 12 while the boundary and attribute thereof are retained, and, at the receiving side, the original text is regenerated by superposing the transmitted blocks 12-1, 12-2 only.

FIGS. 6(a) and 6(b) show two blocks, i.e., a character code block 14 and a bit image block 15 constituting one page of the text (c) including an overlapped block. Also in this case, as explained before, the boundary of the blocks is eliminated, then an overlapping attribute code, indicating an overlay with a reference point B, is given, and transmission is effected. At the receiving side, the data of the blocks 14, 15 are synthesized according to the attribute code, and the text thus obtained is displayed or printed.

It is also possible to develop the code block 12-1 of the overlapping block 12 into bit image data in the program memory PMEM, then overlaying the data with the bit image data of the image block 12-2 and storing the thus obtained image pattern (c) into the image memory IMEM. In this case there are required only three blocks 11, 12, 13 because the boundary and attribute of the code block 12-1 are eliminated, so that a higher transmission efficiency can be attained. The boundary and attribute of the block 12 are same as those of the bit image block 12-2. The boundary position and attribute code of the blocks 11-13 are contained in the headers C, I of the blocks shown in FIG. 4A through 4C.

In the following there will be explained optimum division of transmitting blocks. FIGS. 7A to 7E illustrate examples of division of a text of one page containing a character code data area C and an image data area I.

Figure 7A:
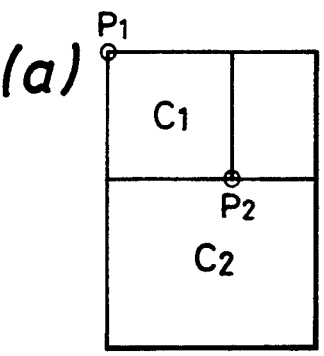
Figure 7A:
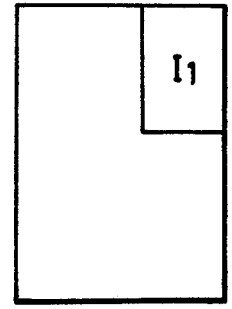

In the example shown in FIG. 7A, the character code area is divided into blocks C1, C2 while the image area is taken as a block I1, without transparent overlapping. In this case the transmission is effected in three blocks C1, C2 and I1. The starting points and sizes of the blocks can be defined by the coordinates of the points P1 and P2.

Figure 7B:
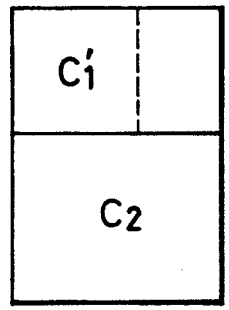
Figure 7B:
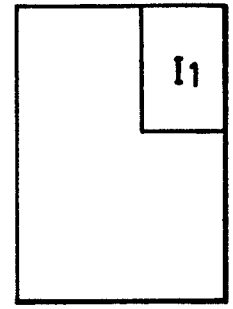

In the example shown in FIG. 7B, a character code block C'1 and an image block I1 are subjected to transparent overlapping. In the block C'1, an area outside C1 has no character code data, but has return codes at the ends of character rows of the area C1. In this case the transmission is conducted in three blocks C'1, C2 and I1.

Figure 7C:
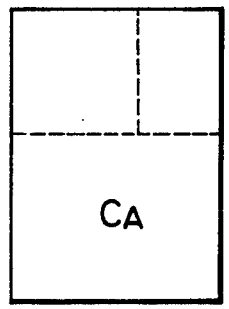
Figure 7C:
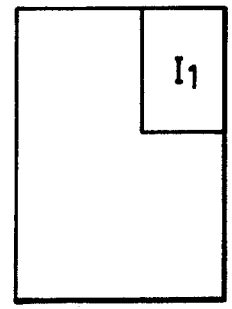

In the example shown in FIG. 7C, the character areas C1, C2 are unified as a one-page block CA which is subjected to transparent overlapping with the image area I1. In this case the transmission is conducted by a page CA and a block I1.

Figure 7D:
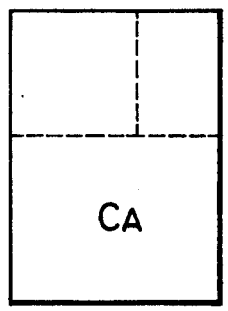
Figure 7D:
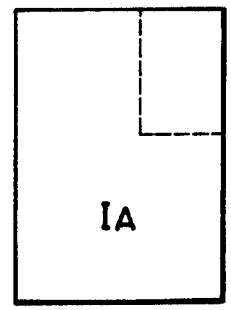

In the example shown in FIG. 7D, the character area C1, C2 and the image area I1 are respectively unified as pages CA and IA which are subjected to transparent overlapping. In this case the transmission is conducted in two pages. The transmission efficiencies in these examples are variable, but, in the present example where characters represent a considerable area, a transmission with a page of character codes and a block of image shown in FIG. 7C is estimated to be rather efficient because the header codes for the blocks C1, C2 can be dispensed with.

The example shown in FIG. 7D also does not require header codes for the blocks, but during image formation of IA, an area outside the area I1 has to be filled with uniform white or black data, which increases the amount of information even when compressed. Consequently, this case is considered disadvantageous.

Figure 7E:
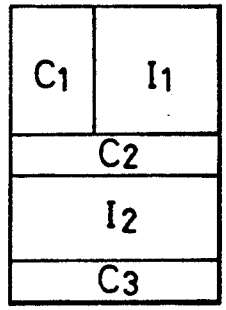

However, if two blocks I1, I2 almost occupy a page as shown in FIG. 7E, there may become advantageous the two-page transmission shown in FIG. 7D, wherein I1 and I2 are considered as a group 1 and C1 to C3 are considered as a group 2.

In this manner the selection of division is different according to the nature and distribution of the information.

In order to identify an optimum division the total amounts of data in various divisions are calculated and compared, and the transmission is conducted according a method of division giving a minimum amount of information to be transmitted.

Figure 8A:
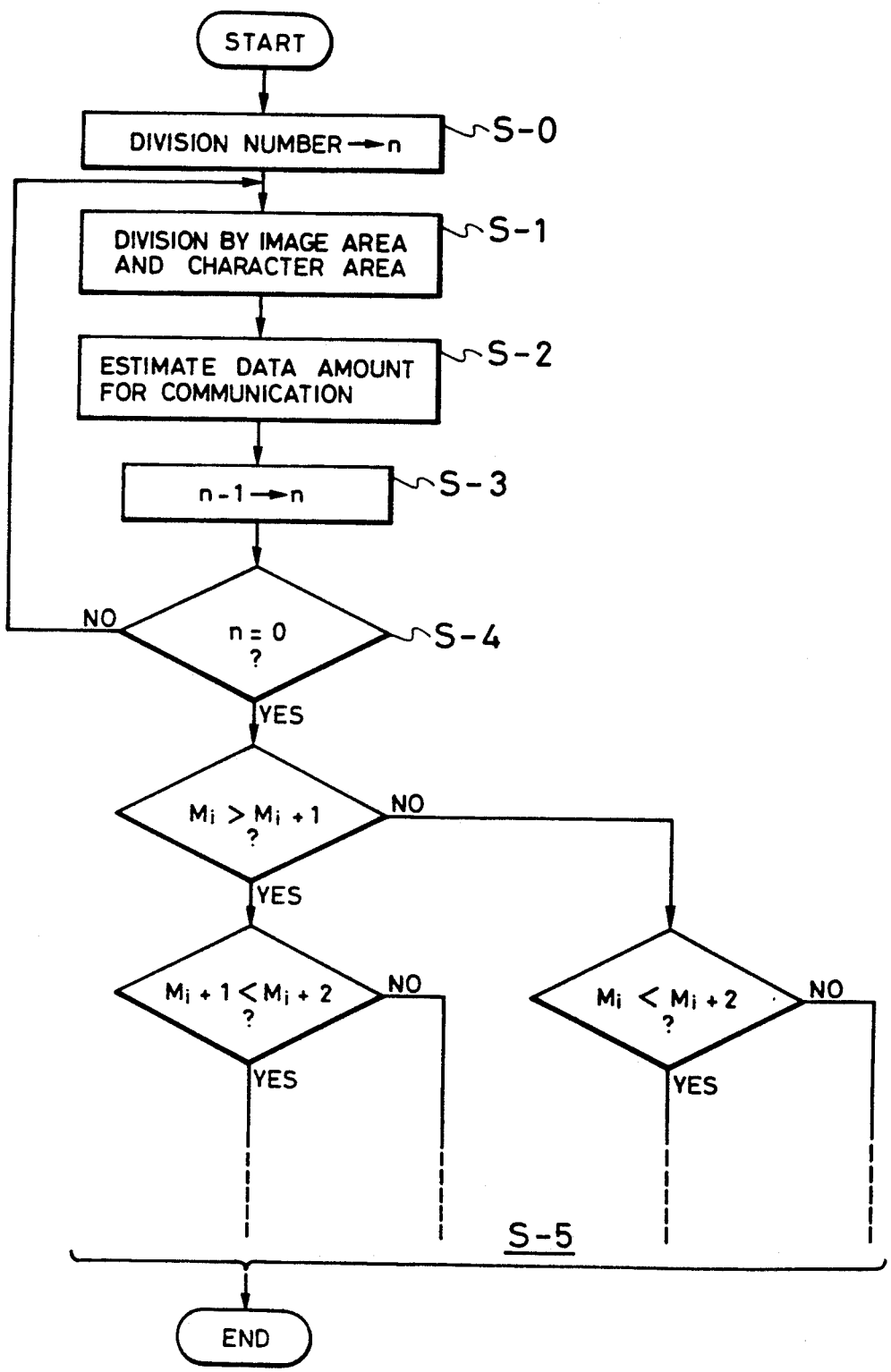
Figure 8B:
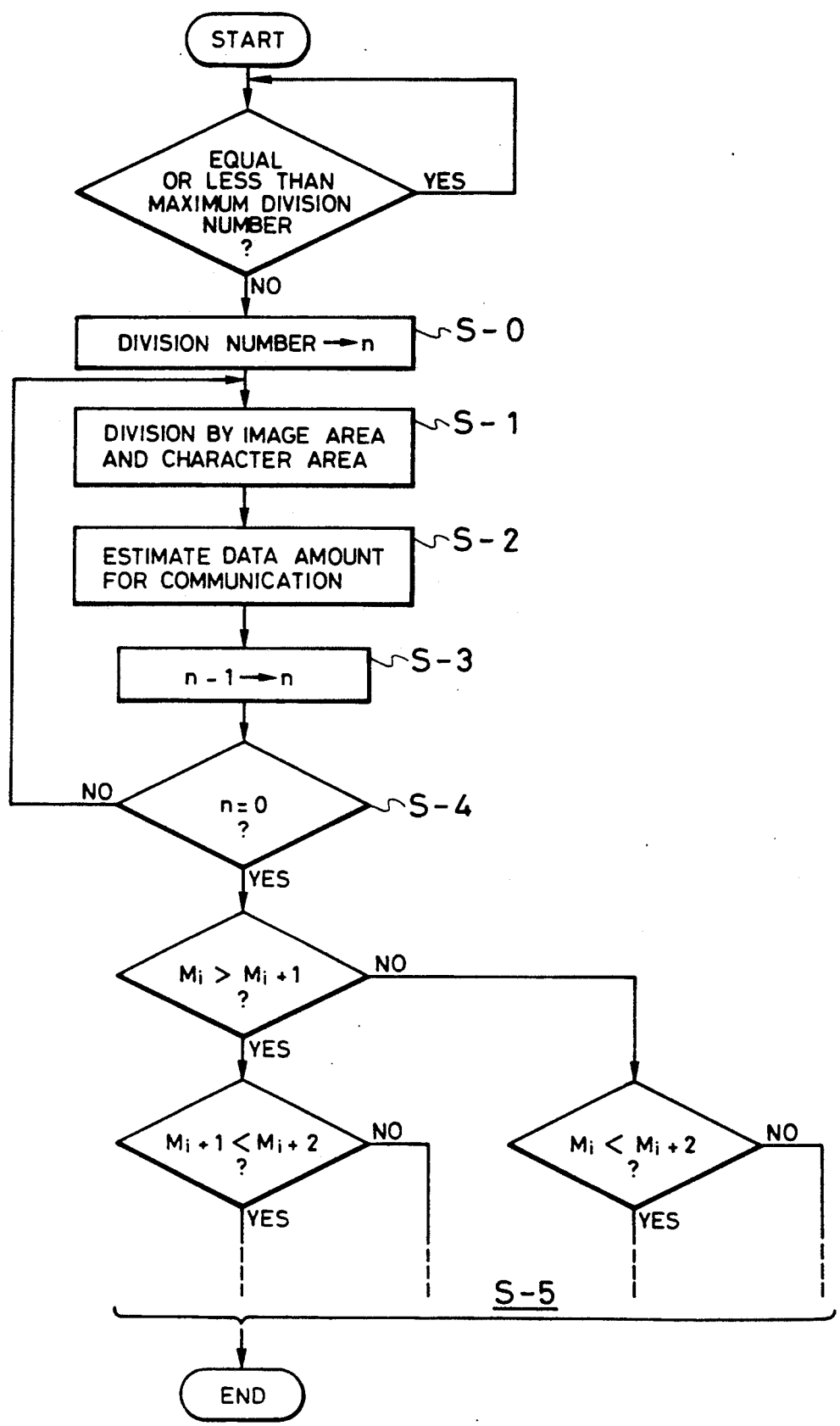

FIGS. 8A and 8B are shows a flow chart of a procedure for such identification.

At first a step S-0 sets "4" as the number n of division of one-page data corresponding to a frame of the cathode ray tube as shown in FIG. 7. A step S-1 effects an area division shown in FIG. 7A, and determines the amounts of data C1m, C2m respectively corresponding to the code data of the block C1 and those of the block C2 in the program memory PMEM, according to the position data P1, P2 at the aforementioned text editing. The data amounts can be obtained from the memory address to the position P2, stored in advance in the memory PMEM. Then a step S-2 compresses the bit data corresponding to the block I1 in the image memory IMEM by means of the ICU 22 to obtain the compressed data amount I1m. Then the total amount of data M1=C1m+C2m I1m is determined and stored in the program memory PMEM. The compressed data are temporarily stored in the rigid disk 50.

Subsequently the program returns to the step S-1 to effect the division of FIG. 7B, thus determining the amount of data corresponding to the block C'1. In this case the amount is almost the same as that of the block C1 shown in FIG. 7A. The obtained amount of data is M2 in this case.

Then there is effected the division shown in FIG. 7C to obtain the data amount corresponding to the block CA, with the total data amount M3.

Then there is effected the division shown in FIG. 7D to obtain the data amount corresponding to the block IA. In the block, the amount of data is obtained by adding, to I1m, the amount of data obtained by compressing white bits outside the block I1. The total data amount in this case is M4.

The number n of divisions is already set as 4. A step S-3 effects a decrement from the number n for each calculation of the total data amount, and a step S-4 discriminates whether the number has reached zero.

Then a step S-5 compares the total amounts of data M1–M4 to determine the dividing mode giving the minimum data amount.

Subsequently the page data are divided according to the thus determined dividing mode and are stored in the rigid disk, and the thus divided blocks are transmitted in succession in response to the transmission command.

In the foregoing explanation the dividing mode is determined according to the total amount of data, but, if the total amount of data does not vary significantly as in the cases shown in FIGS. 7B and 7C, the mode is preferably determined according to the number of blocks, since the transmission of two blocks may be more advantageous in efficiency than the transmission of three blocks. The number of blocks is stored for each of the divisions shown in FIGS. 7A to 7D. It is also possible to achieve block division by manually selecting one of such dividing modes.

In the foregoing there has been explained a mode of determining an appropriate division in response to a transmission command and automatically effecting transmission upon completion of the divison, but it is also possible to effect an appropriate division in response to a preliminary command, then to provide a display of the appropriate division and to effect transmission in response to a transmission command given thereafter.

Also, as another embodiment, it is possible to normally effect a standard block division as shown in FIG. 7A, but, in the case that the number of blocks exceeds a predetermined maximum number, for example 31, to forcedly select a dividing mode in which the number of blocks is less than the maximum level. In such case a discrimination is made as to whether the number of blocks exceeds a maximum number MAX as shown in FIG. 8B, and, if the maximum number is exceeded, the process illustrated in the flow chart shown in FIG. 8A is executed to determine an optimum dividing mode from the amounts of information in various dividing modes not exceeding the maximum number. In this manner the time required for preliminary process prior to transmission can be shortened.

In the following there will be explained an embodiment provided with a character recognizing function in addition to the above-explained functions.

Figure 3:
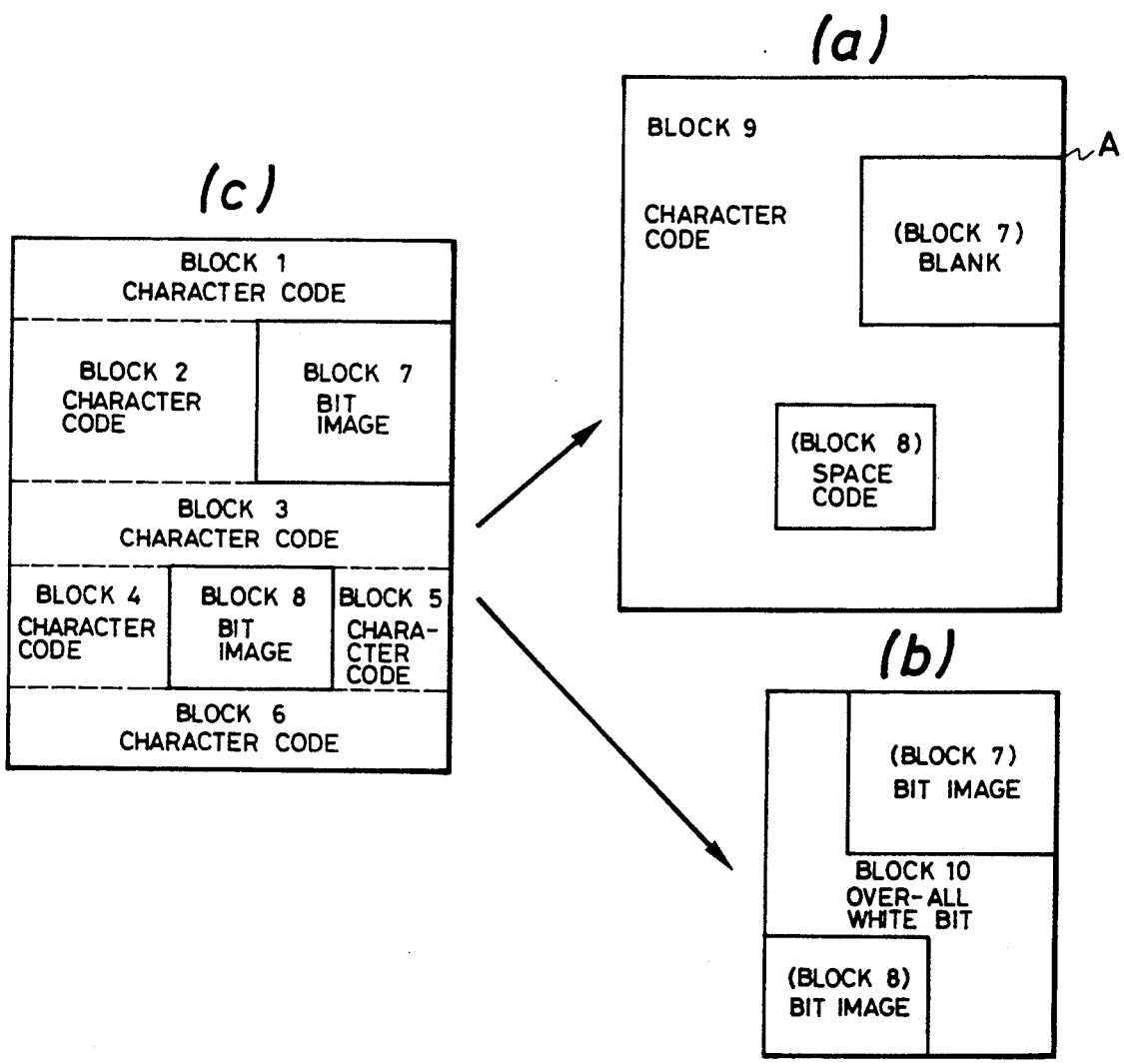
FIGS. 3, 4A to 4C, 6, 7A(a) and 7A(b) through 7D(a) and 7A(b), 7E and 9 are views showing data formats.
Figure 4A:
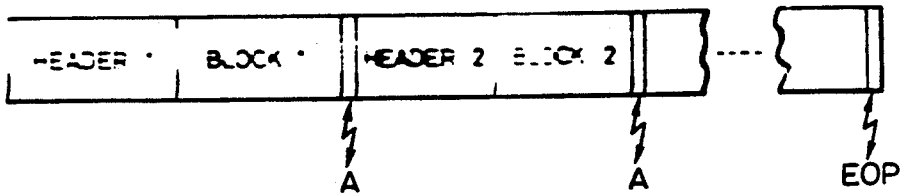
Figure 4B:
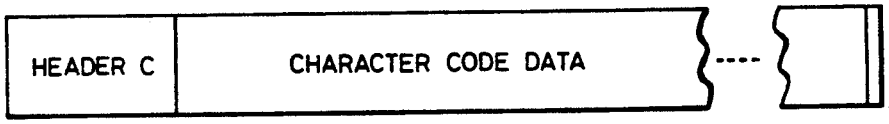
Figure 4C:

Also in this embodiment the structure is same as that shown in FIG. 1. Data of an original text read by the reader 10 are stored in the image memory 25, then subjected to character recognition by the CPU 27 and a corresponding code is allotted to each recognized character. The character recognition can be conducted by an already known process. In such character recognition of the original, certain characters may remain unrecognizable. There will be required a large number of blocks if such unrecognized characters are transmitted as image data of respective different blocks. In the present embodiment, therefore, the recognized characters are transmitted as a code block as shown in FIG. 3, while the unrecognized characters are transmitted as a bit image block, and both are overlaid at the receiving side.

Figure 9:
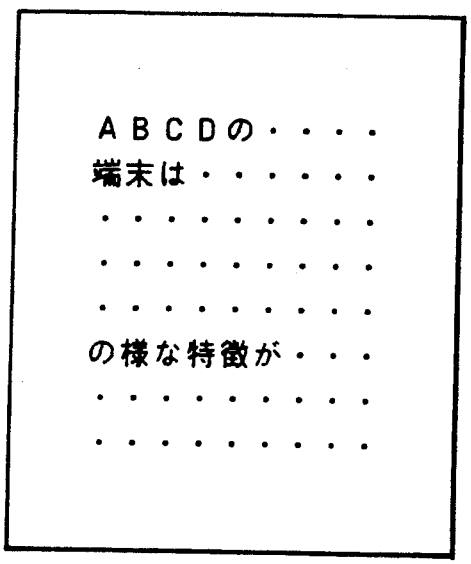
Figure 9:
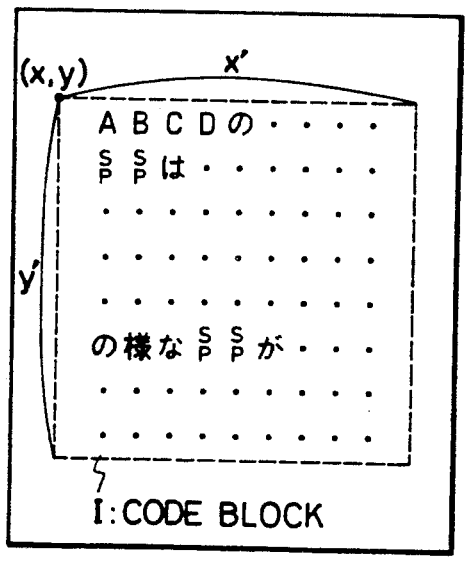
Figure 9:
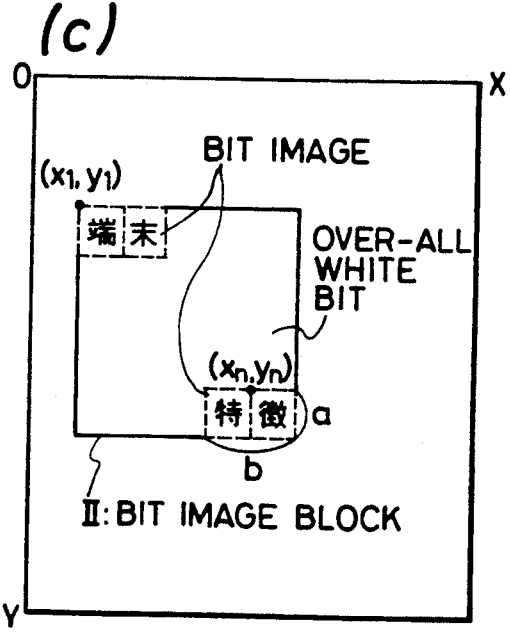

FIGS. 9(a) through 9(c) are shows an example of the fourth preferred embodiment. In the character recognition of an original text shown in FIG. 9(a), it is assumed, by way of example, that two groups of characters remain unrecognized. In the code block shown in FIG. 9(b), blank codes are given to the unrecognized characters.

FIG. 10 is a flow chart showing the control procedure of the CPU 27 in the fourth embodiment.

Now referring to FIG. 10, a step S1 causes the CPU 27 to store the bit image data of the original text, read by the reader 10, in the image memory 25. Succeeding steps S2–S6 effect character recognition character by character. In the character recognition, the bit image data stored in the image memory 25 are at first scanned to recognize a character row, and, upon completion of the recognition, each character column is recognized. In this manner the bit image data of the original text are divided into rows and columns of characters, and each character is then recognized. However the character recognition is not necessarily limited to the process of the present embodiment but may be conducted by various methods.

Steps S-2 and S-3 effect recognition of a character, and a step S-4 stores a corresponding character code into a code block area of the program memory 23 if the character is recognized, or, if the character is unrecognized, stores a space code in the code block area and the bit image data of the unrecognized character in a bit image preparation area of the memory 23, at an address of the unrecognized character. The program memory (PMEM) 23 is provided with a code block area, a bit image preparation area, and a bit image block area. The code block area and the bit image preparation area are respectively provided with addresses of a number of divisions for character recognition (character rows x character columns). The bit image of a character to be recognized is given size information (a, b) of the character bit image block as shown in FIG. 9(c).

When a succeeding step S-6 identifies the completion of recognition of all the characters, a step S-7 discriminates the presence of unrecognizable characters.

If the step S-7 identifies the absence of such unrecognizable characters, a step S-8 attaches information of address and size of the code block, for example (x, y) and (x', y') shown in FIG. 9(b), information indicating the arrangement of characters and identification data indicating a code block, in front of the data of the code block area in the program memory 23, and the transmission is conducted as code block data.

On the other hand, if the step S-7 identifies the presence of unrecognizable characters, steps S-9 to S-12 read the minimum address $x_{min}=x_1$, $y_{min}=y_1$, and the maximum address $x_{max}=x_n$, $y_{max}=y_n$ (see FIG. 9(c)) of the bit image data of the unrecognizable characters in the bit image preparation area of the program memory 23, and steps S-13 to S-15 prepare a bit image block. At first the step S-13 sets the address of the starting point $(x_{min}, y_{min})$ of the bit image block and the size information $(x_{max}+a-x_{min}, y_{max}+b-y_{min})$, and the step S-14 sets identification information indicating that the block is bit image data and an overlap attribute indicating that the block is to be overlapped with the code block. Then the step S-15 stores the bit image data of the bit image preparation area respectively in the areas of unrecognizable characters in the bit image block area, thus obtaining bit image data as shown in the bit image block in FIG. 9(c).

The bit image data thus prepared in the step S-15 are stored as bit image block data in the program memory 23, together with the information set in the steps S-13 and S-14. In this operation, the bit image data may be encoded by the ICU 22.

Then a step S-16 adds, to the code data in the code block area, address information and size information of the code block, identification information and information indicating the arrangement of characters, then stores thus obtained code block data in the program memory 23, and transmits the code block and the bit image block to the destination.

As explained in the foregoing, the fourth embodiment effects encoding of characters by character recognition, and is therefore capable of saving labor in comparison with the character input through the keyboard 61, thus reducing the time required for communication. Besides the unrecognized characters are transmitted in bit image data to achieve secure transmission of the original data. Furthermore the recognized characters and unrecognized characters are respectively transmitted in a code block and a bit image block, so that the number of block is reduced in comparision with the case of dividing the data into plural blocks. In addition the data communication time is therefore reduced and the data processing at the transmitting and receiving sides is simplified. Furthermore, the above-mentioned code block obtained by character recognition may include code data of a text prepared by a word processor.

Examples of different data include graphic code data, character code data, line image bit data, halftone image data, etc.

What we claim is:

1. A data communication process, comprising the steps of;
   generating mixed data including data of a first type and data of a second type in at least one page, said mixed data being divided into a plurality of blocks in accordance with respective data type;
   detecting the existence of plural blocks of data of the first type or the existence of plural blocks of data of the second type in one page of the mixed data; and
   converting the data of one page into one block of data of the first type and one block of data of the second type when plural blocks of data of the first type or plural blocks of data of the second type are detected in the detecting step.

2. A data communication process according to claim 1, wherein said first type of data is image data and said second type of data is character code data.

3. A data communication process according to claim 1, wherein a data length of the data block is variable in accordance with the amount of data in that block.

4. A data communication process, comprising the steps of:
   dividing mixed data into plural blocks, the mixed data having an image data area and a character code area and in one page, said page constituted by at least one of said blocks, at least parts of said image data area and said character code data area overlapping each other, the character code data area, the image data area and their overlapped parts being divided into first, second and third blocks, respectively; and
   transmitting said first, second and third blocks of data, respectively.

5. A data communication process according to claim 4, wherein a data length of each of the first, second and third blocks is variable in accordance with the amount of data of the respective block in question.

6. A data communication process according to claim 4, wherein character code data of the overlapped data portion is converted into image data and the converted image data is combined with the image data of the overlapped data portion.

7. A data communication apparatus, comprising;
   means for dividing mixed data including data of a first type and data of a second type in at least one page, said mixed data being divided into a plurality of blocks in accordance with respective data type; and
   means for detecting the existence of plural blocks of data of the first type or the existence of plural blocks of data of the second type in one page of the mixed data, and for converting data of one page into one block of data of the first type and one block of data of the second type when plural blocks of data of the first type or plural blocks of the data of the second type are detected.

8. A data communication process, comprising the steps of:
   converting first data into second data;
   dividing, when a part of the first data cannot be converted, the part of the first data which cannot be converted and the second data into respective different blocks, said dividing step being performed in accordance with the amount of data not converted; and
   transmitting operably the data for each of the different blocks,
   wherein the first data is image data and the second data is code data.

9. A data communication process according to claim 8, wherein a pattern of the image data is discriminated and the discriminated pattern is converted into code data corresponding thereto.

10. A data communication process, comprising the steps of:
    dividing mixed data of first and second types of data into plural blocks in accordance with data type; and
    transmitting the blocks of data;
    wherein there are plural division modes for dividing the mixed data and one of said division modes is selected to transmit the blocks of said mixed data, said selected mode being a mode in which fewer blocks are brought about in said dividing step, and
    wherein the mixed data comprises at least image and character code data in one page, and the one page of data is divided into a block for character code data and a block for image data in the first mode when the number of the blocks is equal to or more than three in a mode other than the first mode.

11. A data communication process according to claim 10, wherein data is transmitted again at a data receiver and by combining the character code data block and the image data block.

12. A data communication process according to claim 10, wherein space code data is set in an area in which the image data is filled in the character code data block.

13. A data communication process, comprising the steps of:
    generating mixed data including an image data area and a character code data area which partially overlap each other,
    dividing one page of the mixed data into one image data block and one character data block, and
    transmitting the image data block, the character code data block and information indicating that the image data block and the character code data block overlap.

* * * * *

UNITED STATES PATENT AND TRADEMARK OFFICE
CERTIFICATE OF CORRECTION

PATENT NO. : 5,086,434
DATED : February 4, 1992
INVENTOR(S) : SHINTARO ABE, ET AL.

It is certified that error appears in the above-identified patent and that said Letters Patent is hereby corrected as shown below:

COLUMN 2

Line 15, "and 7A(b) through 7D(a)" should read --to--.
Line 16, "and 7A(b)," should be deleted.

COLUMN 5

Line 4, "next" should read --text--.

COLUMN 6

Line 31, "shows" should be deleted.
Line 47, "M1=C1m+C2m I1m" should read --M1=C1m+C2m+I1m--.

COLUMN 7

Line 62, "shows" should be deleted.

COLUMN 9

Line 27, "of;" should read --of:--.

Signed and Sealed this

Thirteenth Day of July, 1993

Attest:

MICHAEL K. KIRK

Attesting Officer

Acting Commissioner of Patents and Trademarks